United States Patent [19]

Banzhaf

[11] Patent Number: 5,428,709

[45] Date of Patent: Jun. 27, 1995

[54] INTEGER STRING RULE DETECTION SYSTEM

[75] Inventor: Wolfgang Banzhaf, Castrop-Rauxel, Germany

[73] Assignee: Mitsubishi Electric Research Laboratories, Inc., Cambridge, Mass.

[21] Appl. No.: 109,666

[22] Filed: Aug. 20, 1993

[51] Int. Cl.⁶ .............................. G06F 15/00
[52] U.S. Cl. ....................... 395/13; 395/922
[58] Field of Search ............ 395/13, 51, 10, 922, 395/22, 65–66

[56] References Cited

U.S. PATENT DOCUMENTS

| | | | |
|---|---|---|---|
| 5,148,513 | 9/1992 | Koza et al. | 395/13 |
| 5,182,793 | 1/1993 | Alexander et al. | 395/13 |
| 5,245,696 | 9/1993 | Stork et al. | 395/13 |
| 5,255,345 | 10/1993 | Shaefer | 395/13 |
| 5,283,856 | 2/1994 | Gross et al. | 395/51 |
| 5,343,554 | 8/1994 | Koza et al. | 395/13 |

OTHER PUBLICATIONS

Bekey et al "Optimal and suboptimal binary inputs for system identificaiton"; IEEE Transactions on Systems, Man and Cybernetics, pp. 1199–1202, vol. 19, iss. 5; Sep.–Oct. 1989.

*Primary Examiner*—Allen R. MacDonald
*Assistant Examiner*—Tariq Hafiz
*Attorney, Agent, or Firm*—Robert K. Tendler

[57] ABSTRACT

A system is provided for determining the rule or set of rules which govern the generation of a string of integers so as to ascertain the nature of the data represented by the string of integers, with the integer generation rule permitting genetic code determinations, optimization of communication channels through received signal analysis, curve fitting and determination of integer coding. For the analysis, means are provided to generate strings of integers from trial programs that are optionally derived from sequences of binary numbers. Error coefficients are derived when the integer strings generated by the trial programs are compared to the initial integer string. Means are provided to select a reduced set of trial programs based on the derived error coefficients, with the process of selection of trial programs being iterated until a single trial program is selected as the best trial program. This best trial program then specifies the most likely rule responsible for the generation of the initial strings of integers. The decoding system uses no a priori knowledge in the selection process, with the system providing automatic generation of algorithms instead of inaccurate fit functions. In one embodiment, the Subject System is implemented in a low-level binary representation, which is fast and easy to implement in hardware.

5 Claims, 4 Drawing Sheets

INTEGER STRING RULE DETECTION SYSTEM

FIELD OF THE INVENTION

This invention relates to integer string analysis, and more particularly to a system for determining integer string patterns for determining the rule upon which the integer was based or created.

BACKGROUND OF THE INVENTION

It will be appreciated that there are various integer strings which are created by various coding systems, both in nature and through either inadvertent action of a system, such as a communication system, or by design, such as format codes, programming languages, error-detection, or encoding systems. Aside from computer generated binary coding sequences involving integer strings, genetic engineering has provided the opportunity to ascertain genetic coding through analysis of coding sequences corresponding to various genes or portions of genes. For instance, it is now possible to ascertain the biologic rules governing genetic make-up through characterizing a genetic code by a series of integers.

The ability to derive rules from those sequences so as to be able to successfully predict succeeding numbers in a series is valuable if an algorithm or set of algorithms can predict a successor to an arbitrary predecessor. Traditionally, this has been the realm of I.Q. testing or other tests measuring the intelligence of human beings. But human trial-and-error methods are very limited in quickly deriving rules for large amounts of integer number sequences.

In the field of information transmission through communication channels one often finds systematic distortions of signals as opposed to random noise. These systematic distortions result from interaction of the input with characteristic features of the channel itself. It is of interest for both the sender and receiver of a message that the input signal or information is communicated as correctly as possible through the channel. For this purpose, various error correction schemes exist, to provide error-free transmission of the information of the sender, usually by feed-back systems which predistort the transmitted signal for channel induced systematic errors.

By way of further background, the automatic evolution of algorithms in machines has been studied in recent years for various purposes. Based on a collection of building blocks for algorithms that can be combined to provide different algorithms, a variety of behaviour is provided that can be evaluated against the actual computational task at hand. There exist various error measures used in the field of neural networks which are available for measuring the success of failures of a particular algorithm. In the neural network field, however, the mechanisms of computation are completely different, and it is not possible to encode rules in a compact description. Rather the systems have a tendency to "memorize" string patterns, and to make predictions on that basis.

J. Koza of Stanford Univ. has studied the evolution of algorithms in a symbolic computer language like LISP, by manipulating strings that are commands of that high-level language. In the Koza approach, one applies a sort of symbolic Genetic Algorithm with the symbols being chosen from a set of functions and terminals. A function is generally defined as an operator or active unit that possesses one or more arguments on which it acts, which are themselves either functions or terminals. A terminal is an operand or passive unit, on which the function that possesses this operand acts on.

From the set of accessible functions and terminals computer programs are composed by forming symbolic expressions called S-expressions. These symbolic expressions are subsequently interpreted and evaluated using given input/output pairs for the anticipated behavior of the targeted computer program or algorithm. A selection process then singles out fitter programs which are reproduced and mutated for a next generation of programs.

The disadvantage of such a system is that it is slow because it uses symbolic expressions and because of the complicated combination processes between strings that have to be applied in order to arrive at new variations of strings that correspond to algorithms.

For further background, the following is a list of articles describing prior methods useful in the prediction of integer number sequences.

D. E. Goldberg. Genetic Algorithms in Search, Optimization & machine Learning. Adison-Wesley, New York, 1989; J. Holland. Adaptation in natural and artificial systems. University of Michigan Press, Ann Arbor, 1975; S. Kirkpatrick et al., Simulated Annealing, Science, Vol 220, 1983, p. 671; N. Metropolis, J. Chem. Phys., Vol. 21, 1953, p. 1087; J. Koza. Genetic Programming. MIT Press, 1992, Cambridge; J. Koza. Hierarchical Genetic Algorithms operating on populations of computer programs. Proc. 11th IJCAI, 1989, Morgan Kauffman, San Mateo, Calif., 1989; M. R. Schroeder. Number Theory in Science and Communication. Springer, Berlin, 1986; C. E. Shannon. A mathematical theory of communication. Bell System Technical Journal, 27, 1948, 379.

SUMMARY OF THE INVENTION

Rather than using symbolic expressions, a system is provided for determining the rule or set of rules which govern the generation of a string of integers through the generation of a series of trial programs from binary strings used to generate trial integer strings against which the incoming integer string is compared. This permits rapid determination of the nature of the data represented by the string of integers, with the integer generation rule permitting genetic code determinations, optimization of communication channels through received signal analysis, curve fitting and determination of integer coding. For the analysis, means are provided to generate a number of integer sequences from trial programs and to derive error coefficients when the integer sequences generated by the trial programs are compared to the initial integer string. Means are provided to select further trial programs based on error coefficients to generate further trial programs, run in parallel, for closer approximation in a process which converges on the best trial program. In one embodiment, in order to generate this set of trial programs an algorithm and a random number generator are used to generate a set of trial programs without any foreknowledge of the way in which the string of integers was produced.

Thus, the decoding system uses no a priori knowledge in the selection process, with the system providing automatic generation of trial programs instead of inaccurate fit functions. In one embodiment, subject system is implemented in a low-level binary representation, which is fast and easy to implement in hardware.

More specifically, the subject integer number sequence detection system, unlike the Koza system, starts out with a collection of binary strings called a population, which is originally generated using a random number generator, with the strings being subsequently compiled as the trial programs. These trial programs in turn generate integer strings against which the input string is compared. This interpretation of the binary strings as trial programs is achieved by using a translation mechanism specifying which binary code of a given length corresponds to which element from the set of functions and terminals available. Since most binary strings do not result in programs which work, the resulting symbol combination is processed so as to ascertain that it is working as a correct program. This is done by correction and repair of the binary strings as well as editing of the symbolic sequence.

Variation of the selected binary strings using random number generators and the operations described below result in better and worse programs. The selection process assures that better programs are kept, worse are discarded.

In adopting the method of using binary strings one is able to use very simple operators for the variation of already existing programs. Secondly, one is able to compile the programs into the native machine language of computers that runs much faster than interpretation of programs based on their symbolic content. In addition, one is able to apply simulated annealing instead of genetic selection in order to find the best algorithm for a sequence.

Programs which generate integer sequences are then used as trial programs, with their respective performance being ranked as a function of an error measure which is the result of comparing this integer sequence generated by the trial programs with the integer sequence that forms the input to the system. Thus evaluation is done by using an error measure to rank all the programs in the population with respect to their behaviour against a given integer number sequence.

BRIEF DESCRIPTION OF THE DRAWINGS

These and other features of the Subject Invention will be better understood in conjunction with the Detailed Description taken in conjunction with the Drawings of which.

DETAILED DESCRIPTION OF THE INVENTION

Figure 1:
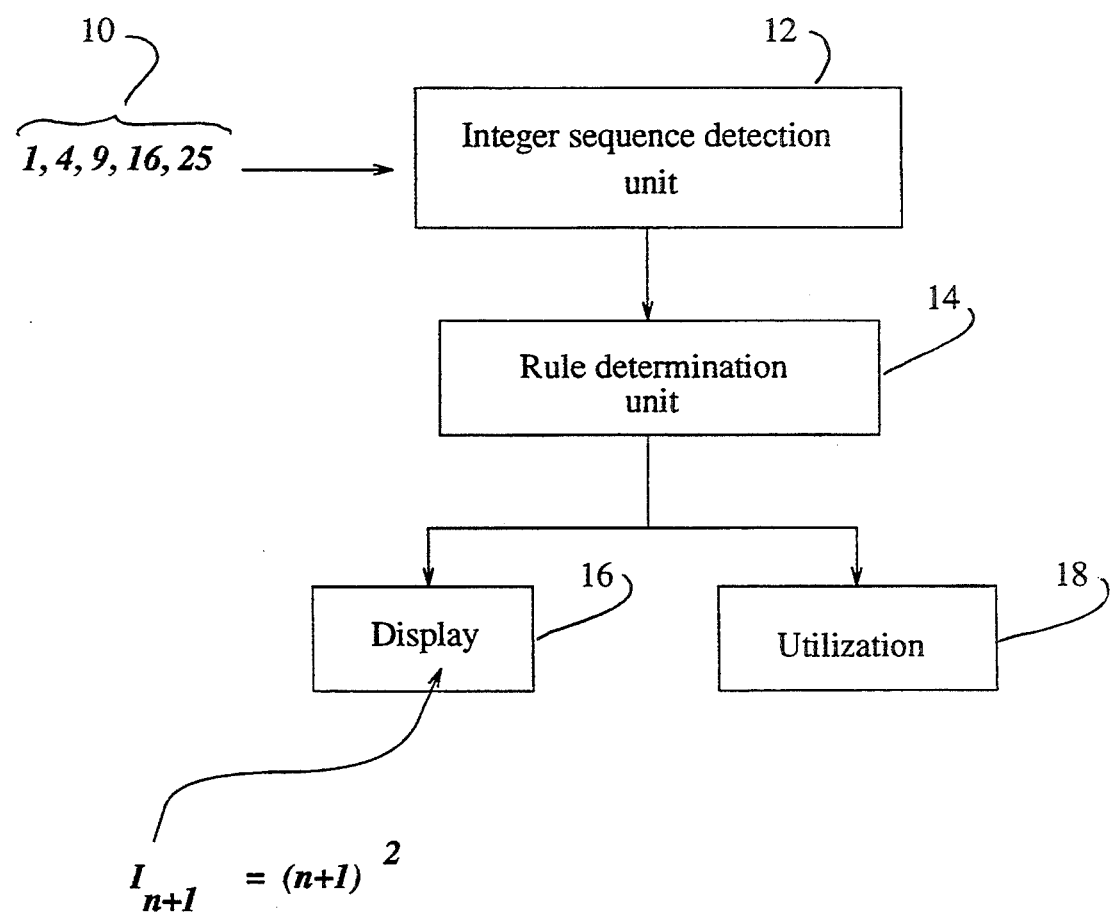
FIG. 1 is a block diagram of the Subject System illustrating integer sequence prediction and rule determination for an input integer sequence, with display of the rule governing the generation of the input integer sequence.

Referring now to FIG. 1, in the subject system an integer string 10 is coupled to an integer sequence detection unit 12 which detects when a synthetically generated integer string closely approximates the input string. Unit 12 generates a series of integers strings, based on a number of programs, with each program corresponding to a particular rule of integer sequence generation. Upon detection of the closest integer string a rule determination unit 14 identifies the program which generated the integer string with which the input integer string is compared.

The result is a display 16 of the rule corresponding to the rule which resulted in the generation of input string 10. In this case the input string 10 is composed of the following integers: 1, 4, 9, 16, 25. The rule determined to be governing the generation of input string 10 is $I_{n+1}=(n+1)^2$.

It will be appreciated that having determined the rule governing the integer string, this rule can be utilised by a utilisation unit 18 to, for instance, remove systematic distortions from a communications channel, as will be described in connection with FIG. 3.

Figure 2:
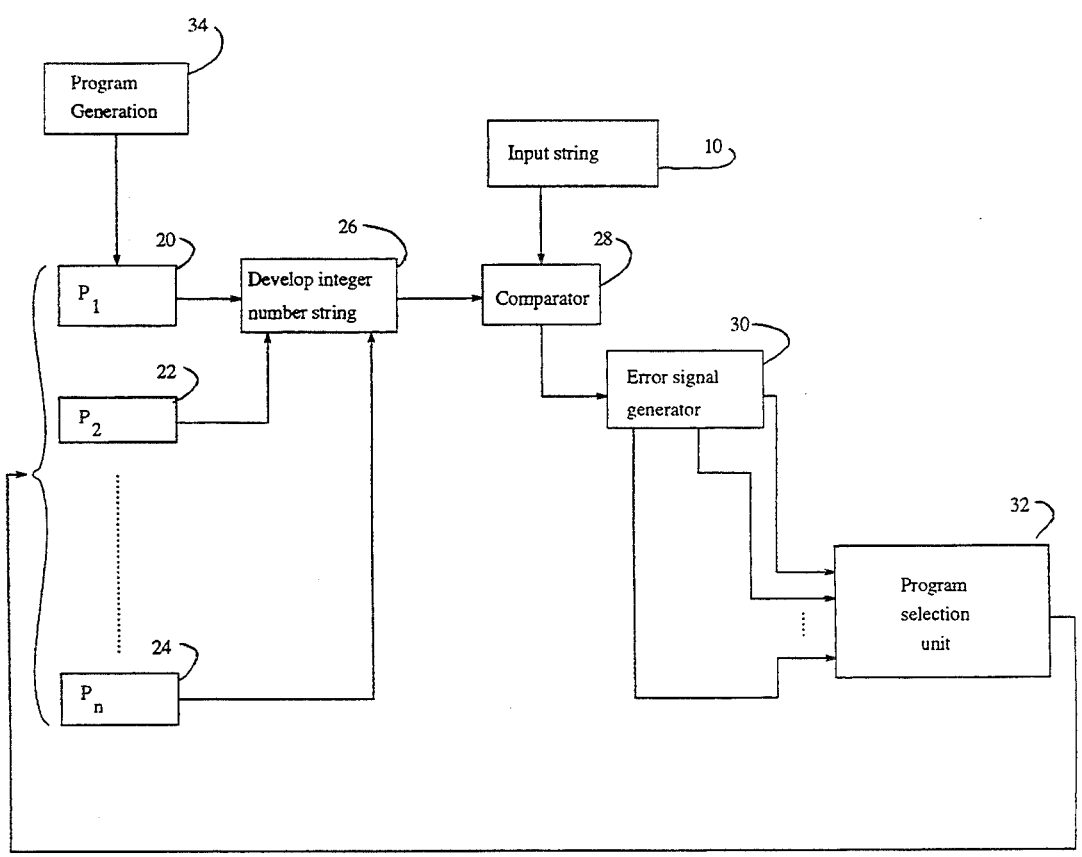
FIG. 2 is a block diagram illustrating the provision of a series of programs from which integer number strings are developed and with which string is compared for the generation of an error signal that is used in an iterative process to arrive at the program which best describes the rule upon which the integer string is generated.

Referring now to FIG. 2, a system is described for detecting the integer sequence of FIG. 1. Here, a series of programs $P_1, P_2, \ldots, P_n$, here shown at 20, 22 and 24 is utilised at 26 to develop corresponding integer strings. The output of unit 26 is coupled to a comparator 28 which compares each of the developed integer strings with the input string 10. The output of comparator 28 is coupled to an error signal generator 30 which provides an error signal or ranking measure of the closeness of the trial strings to the input string.

These ranking measures are utilised by a program selection unit 32 to select for a next interation that program or series of programs which results in integer strings which better approximate the input string. The process is continued until the error between the input string and the trial strings is zero or within some predetermined error bound. Having determined which program is the final selected program, this corresponds to the rule represented by the program and therefore identifies insofar as possible the rule untilised in the generation of the input string.

The programs can be obtained a priori by simply listing common methods of generating integer strings. For instance, one program could simply result in an integer string generated according to $I_{n+1}=n+1$. It could also, for instance, result in an integer string generated in accordance with $I_{n+1}=n+2$. The rule could, of course, be more complex, such as $I_{n+1}=(n+1)^2$.

While it is possible to provide for instance 100 such programs from a list, such selection of programs might suffer from a presumption of how the input string was generated. This requires foreknowledge of the likely characteristics of the input string. Thus, as part of the Subject Invention, programs in one embodiment are randomly generated by a program generator 34 to provide a series of programs which have no bias as far as integers are concerned. In one embodiment the programs are generated by starting from random binary strings which are translated into a sequence of functions which upon execution yields a sequence of integer numbers. As an example, the binary string 00010 translates into the multiplication function "times" which acts upon a later translated portion of the binary string to provide an algorithm or program from which a predetermined trial string is generated, namely the "multiplication trial string".

Figure 3:
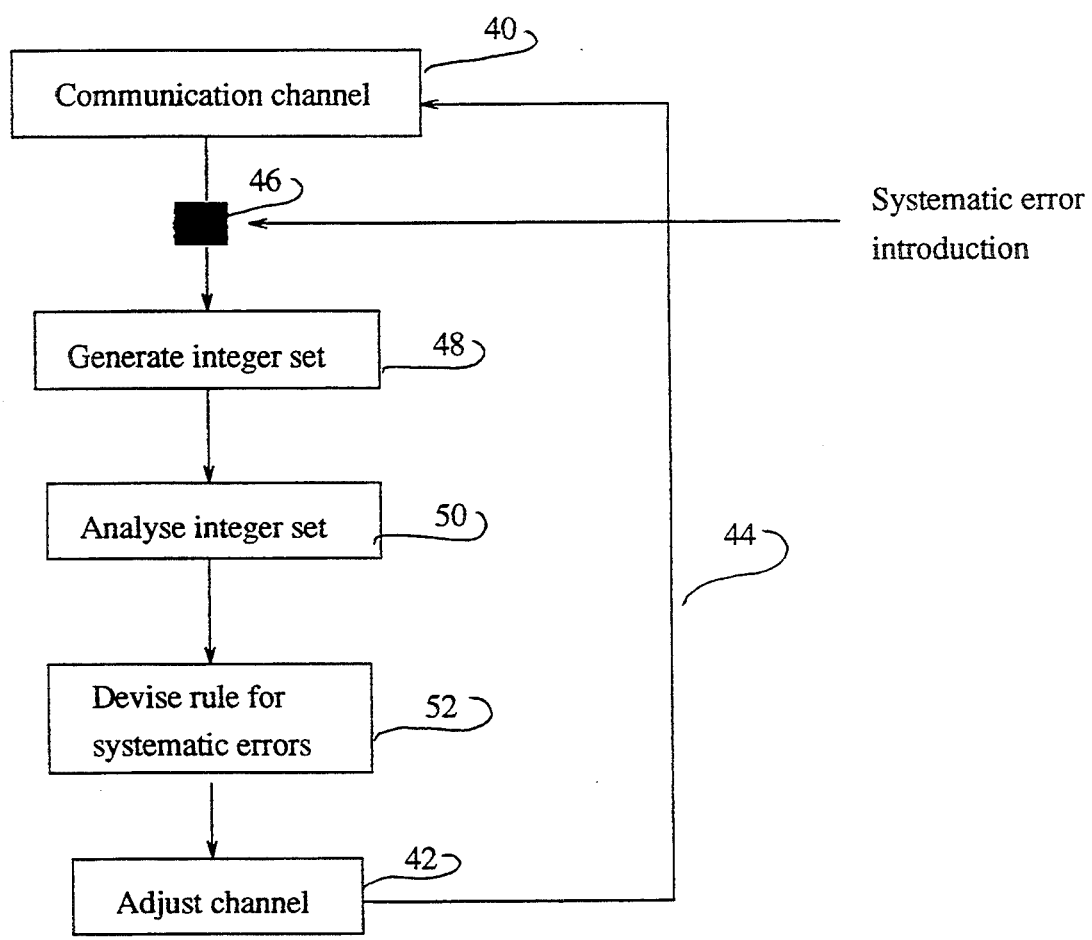
FIG. 3 is a block diagram of the utilisation of the rule detection system as applied to a communications channel for the detection of systematic errors and the elimination of the errors in the communication channel; and, FIG. 4 is a flow chart illustrating not only the utilisation of the set of programs to determine the rule for the generation of the input integer string, but also the generation of the programs themselves based on the generation of random strings.

Referring now to FIG. 3, the subject system can be utilised to detect the rule governing systematic errors introduced into a communication channel 40 and to adjust the channel as illustrated at 42 and feed-back loop 44 to eliminate these systematic errors. The systematic error is introduced within communication channel 40 as illustrated at 46. In order to measure the systematic error in the channel, an integer set is generated at 48 to be introduced into the channel, with the resulting output being analysed at 50 to determine the difference between the integer test set and what has resulted in the output of the channel.

Having derived a set of integers which represent the channel distortion, the subject system is utilised to discover a rule which describes the systematic error, assuming the systematic error can be characterized by such a rule. This is accomplished by unit 52. If an identifiable rule can be ascertained, it is then possible to adjust the channel to eliminate or reduce the distortion.

Figure 4:
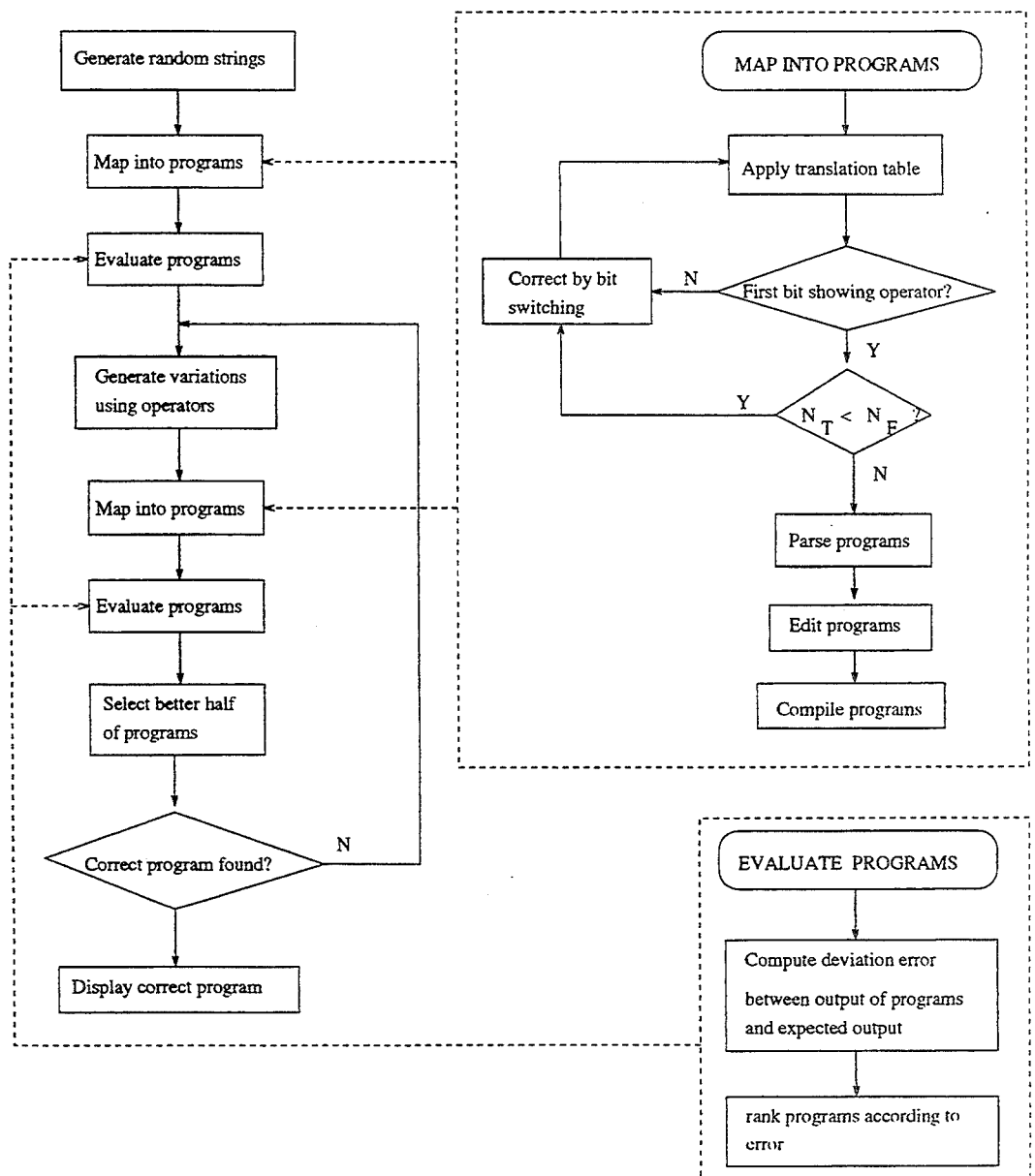

Note that FIG. 4 describes an algorithm for generating the programs which result in trial strings more particularly described by the program listing provided hereinafter.

By way of further explanation, the way that numbers are used by the various programs, it is noticed that programs receive integer numbers $I_0^{(\alpha)}, I_1^{(\alpha)}, \ldots, I_L^{(\alpha)}$ as input in each input/output example $\alpha$, with $I_0^{(\alpha)}$ being a counter of the input and $I_1^{(\alpha)}, \ldots, I_L^{(\alpha)}$ being the L predecessors of the number expected next in the sequence. As an output a program is required to produce an integer $O^{(\alpha)}$ for each instance of $\{I_0^{(\alpha)}, I_1^{(\alpha)}, \ldots, I_L^{(\alpha)}\}$ $$O^{(\alpha)} = g(I_0^{(\alpha)}, I_1^{(\alpha)}, \ldots, I_L^{(\alpha)}) \quad (1)$$

with g being a more or less complicated function encoded by the corresponding binary string.

The evaluation function that controls the selection process for selecting the better programs can be stated, for instance, as the sum square error in producing the given sequence:

$$E = \sum_\alpha (O^{(\alpha)} - O_0^{(\alpha)})^2 \quad (2)$$

where the target number $O_0^{(\alpha)} = I^{(n+1)}$ is identified with the follower to $I^{(n)} = I_1^{(\alpha)}$ in the input string. By definition, $E \geq 0$, and one is looking for correct solutions defined by $E = 0$.

As an example, one may use only one predecessor, so $L=1$. In this specific embodiment, the terminal set T contains $$T = \{I_0, I_1, 0, 1, 2\} \quad (3)$$

that includes the smallest natural numbers for internal computations. This table can be easily extended to match the terminals necessary to achieve other sorts of program behavior.

The function set consists of basic operations possible with integer numbers, like addition, subtraction, multiplication, division, exponentiation, as well as the modulo and absolute value function and a comparison function returning an integer value.

$$F = \{PLUS, MINUS, TIMES, DIV, POW, ABSV, MODU, IFEQ\} \quad (4)$$

All of these functions require two arguments, with the exception of the absolute value. Yet also the absolute value is implemented using the default 2 argument function, with the second argument of the function as a dummy variable. This part of the table can be easily extended or replaced, depending on the specific functions necessary in a particular set of problems.

Table 1 presented hereinafter shows as an example 5-bit translation of binary numbers.

TABLE 1

| String Code | | | | | Translation | String Code | | | | | Translation |
|---|---|---|---|---|---|---|---|---|---|---|---|
| 0 | 0 | 0 | 0 | 0 | PLUS  | 1 | 0 | 0 | 0 | 0 | I0 |
| 0 | 0 | 0 | 0 | 1 | MINUS | 1 | 0 | 0 | 0 | 1 | I1 |
| 0 | 0 | 0 | 1 | 0 | TIMES | 1 | 0 | 0 | 1 | 0 | 1 |
| 0 | 0 | 0 | 1 | 1 | DIV   | 1 | 0 | 0 | 1 | 1 | I0 |
| 0 | 0 | 1 | 0 | 0 | POW   | 1 | 0 | 1 | 0 | 0 | I1 |
| 0 | 0 | 1 | 0 | 1 | ABSV  | 1 | 0 | 1 | 0 | 1 | 1 |
| 0 | 0 | 1 | 1 | 0 | IFEQ  | 1 | 0 | 1 | 1 | 0 | 0 |
| 0 | 0 | 1 | 1 | 1 | MODU  | 1 | 0 | 1 | 1 | 1 | 2 |
| 0 | 1 | 0 | 0 | 0 | MODU  | 1 | 1 | 0 | 0 | 0 | I0 |
| 0 | 1 | 0 | 0 | 1 | ABSV  | 1 | 1 | 0 | 0 | 1 | I1 |
| 0 | 1 | 0 | 1 | 0 | TIMES | 1 | 1 | 0 | 1 | 0 | 1 |
| 0 | 1 | 0 | 1 | 1 | POW   | 1 | 1 | 0 | 1 | 1 | I0 |
| 0 | 1 | 1 | 0 | 0 | DIV   | 1 | 1 | 1 | 0 | 0 | I1 |
| 0 | 1 | 1 | 0 | 1 | MINUS | 1 | 1 | 1 | 0 | 1 | 1 |
| 0 | 1 | 1 | 1 | 0 | PLUS  | 1 | 1 | 1 | 1 | 0 | 0 |
| 0 | 1 | 1 | 1 | 1 | IFEQ  | 1 | 1 | 1 | 1 | 1 | 2 |

It may be noticed that the coding of certain functions or terminals is redundant. Translations are placed randomly so the full 5-bit set of possible codings is used. A specific feature of this embodiment is that the first bit in this code specifies whether a terminal ("1") or a function ("0") is coded.

Table 2 presented hereinafter explains the corresponding actions taken by a program.

TABLE 2

| Function name | Action | Description |
|---|---|---|
| PLUS(a,b) | a + b | Integer Addition |
| MINUS(a,b) | a − b | Integer Subtraction |
| TIMES(a,b) | a * b | Integer Multiplication |
| DIV(a,b) | a / b | Integer Division |
| POW(a,b) | $a^b$ | Integer Exponentiation |
| ABSV(a,b) | \| a \| | Absolute Value |
| MODU(a,b) | a modulo b | Modulo Operation |
| IFEQ(a,b) | 1 if a = b , 0 otherwise | Comparison Operation |

Some of the operations needed to be modified in order to have valid numerical behavior for all possible arguments. As an example, bitstrings that have to be translated into programs are of length l=225 transscribing into N=45 symbols from the sets F and T. Usually, the raw translation of a string does not fit grammar. With two arguments per operator, the following requirements have to be fulfilled:

(i) The number of terminals $N_T$ must be larger than the number of functions $N_F$ $$N_T > N_F \quad (5)$$

and (ii) each sequence should start with a function call.

In order to assure these requirements a string is scanned by a repair operator that corrects corresponding bits in the sequence. Resulting strings are subsequently parsed and the proper number of parentheses is inserted. Finally, the standard function structure is added generating program code that can be handed over to a compiler.

Specific measures have been taken to assure that all operations result in valid integer numbers. Integer division rounds to next integer, a division through 0 results in a maximum value of 1000. The integer exponentiation $0^0$ results in 1. The absolute value functions carries a dummy argument b. The modulo operation with $b=0$ returns a.

Depending on the number of arguments supplied by the string code, a shallowly nested or a deeply nested function results. It will be appreciated, that the resulting programs are of varying length in the number of functions and terminals, even though the binary strings never change length.

The operators employed to constantly vary the population were taken from a set of bit-manipulating operators. To exemplify their respective effect, 10-bit strings are considered in the following (with probabilities of operator application in parentheses):

(1) 1-bit mutation ($p_1$)

$$0011111001 \rightarrow 0111111001$$

(2) n-bit mutation ($p_2$)

$$0011111001 \rightarrow 0011110110$$

(3) 1-bit shift right, only category bits ($p_3$)

$$0011111001 \rightarrow 1011101001$$

(4) 1-bit shift right, all bits ($p_4$)

$$0011111001 \rightarrow 1001111100$$

(5) 1-bit shift left, only category bits ($p_5$)

$$0011111001 \rightarrow 1011101001$$

(6) 1-bit shift left, all bits ($p_6$)

$$0011111001 \rightarrow 0111110010$$

(7) 1-point crossover, only at category bits ($p_7$)

$$0011111001 + 0000110000 \rightarrow 0011110000$$

A selection scheme has to be chosen for the process of generating an improvement in the population. Well-known schemes are generational selection and steady state selection. Also, a selection scheme, based on simulated annealing can be applied.

It will be appreciated that any of a variety of error measures can be utilized when comparing the initial string with the trial strings. If in the most simple case there is an exact match between the input string and a trial string, then no iterative process is necessary. As a result, the rule that generated the trial string is identified as the rule that generated the input string. However, such a simple situation is rare when, for instance, attempting to detect systematic errors in a communications channel, or when trying to determine a particular genetic code. In order to determine such complicated rules, in the Subject System the error measure is utilized to identify a subset of the original trial programs which better characterizes the input sequence. The trial string matching process continues in an iterative fashion to select further reduced subsets of the trial programs until either a best program is selected or until no program results in a trial string close enough to the input string.

Another way of generating and selecting programs is to start out with a relatively small number of trial programs. If none result in an error measure indicating rule detection, the population of trial programs can be increased to include more and different trial programs. This can be done in the Subject System through the automatic trial program generator which is based on binary number manipulation. Thereafter, the iterative comparison continues, with the population of trial programs being expanded and contracted until a satisfactory result is obtained.

One example of a selection scheme incorporating this latter philosophy is described in the program listing in FORTRAN which follows:

DIALOG

```
# csh for n generations
#echo "Use number of generations as argument! "
#   exit 1
#endif
#   input
rm -f ex.dat
getsequence.out initialisierung
rm -f seq.dat
rm -f seqtrans.dat
rm -f seq.new
rm -f seqtrans.new
rm -f quality.new
rm -f pss
/usr/contrib/bin/top > pss
inoculate.out
rm -f func.tmp
```

```
rm -f func.dat
edit.out
cp func.tmp func.dat
rm -f log.tmp
(f77 -w +es -o eval.out eval.f) >& log.tmp
rm -f quality.dat
eval.out > quality.dat @ count = 25 loop
while ($count != 0)
    @ count--
    @ counter++
    echo "Generation " $counter
    rm -f seq.tmp
    rm -f seqtrans.tmp
    rm -f pss
    /usr/contrib/bin/top > pss
    vary.out
    rm -f func.tmp
    editloop.out
    rm -f log.tmp
    (f77 -w +es -o eval.out eval.f) >& log.tmp
    rm -f quality.tmp
    eval.out > quality.tmp
    sort +2 -n -o qd.tmp quality.dat
    sort +2 -n -o qt.tmp quality.tmp
    rm -f selerg
    select.out > selerg
    rm -f seq.dat
    rm -f seqtrans.dat
    rm -f quality.dat
    mv seq.new seq.dat
    mv seqtrans.new seqtrans.dat
    mv quality.new quality.dat
    rm -f func.tmp
    rm -f func.dat
    edit.out
    cp func.tmp func.dat
    set mark=0
    grep eureka selerg && set mark=1
    if ($mark == 1) then
        rm -f log.tmp
        (f77 -w +es -o predict.out predict.f) >& log.tmp
        predict.out
        exit
    endif
end
echo "Sorry, it didn't work in the first trial! "
echo "Now let me try harder! I'll start again. "
rm -f pred.dat
rm -f log.tmp
rm -f funcalt.dat
(f77 -w +es -o predict.out predict.f) >& log.tmp
predict.out > pred.dat < p.dat
rm -f exalt.dat
mv ex.dat exalt.dat
prepare.out

#echo "init2 "
#  initialisierung2
rm -f seq.dat
rm -f seqtrans.dat
```

```
rm -f seq.new
rm -f seqtrans.new
rm -f quality.new
rm -f pss
/usr/contrib/bin/top > pss
inoculate.out
rm -f func.tmp
rm -f func.dat
edit.out
cp func.tmp func.dat
rm -f log.tmp
(f77 -w +es -o eval.out eval.f) >& log.tmp
rm -f quality.dat
eval.out > quality.dat @ count = 25 loop
while ($count != 0)
    @ count--
    @ counter2++
    echo "New Generation " $counter2
    rm -f seq.tmp
    rm -f seqtrans.tmp
    rm -f pss
    /usr/contrib/bin/top > pss
    vary.out
    rm -f func.tmp
    editloop.out
    rm -f log.tmp
    (f77 -w +es -o eval.out eval.f) >& log.tmp
    rm -f quality.tmp
    eval.out > quality.tmp
    sort +2 -n -o qd.tmp quality.dat
    sort +2 -n -o qt.tmp quality.tmp
    rm -f selerg
    select.out > selerg
    rm -f seq.dat
    rm -f seqtrans.dat
    rm -f quality.dat
    mv seq.new seq.dat
    mv seqtrans.new seqtrans.dat
    mv quality.new quality.dat
    rm -f func.tmp
    rm -f func.dat
    edit.out
    cp func.tmp func.dat
    set mark=0
    grep eureka selerg && set mark=1
    if ($mark == 1) then
        echo "With " $counter "+ " $counter2 "generations "
        rm -f log.tmp
        (f77 -w +es -o predict2.out predict2.f) >& log.tmp
        predict2.out
        exit
    endif
end
echo "I did'nt succeed, but let me at least give you what I achieved! "
rm -f log.tmp
(f77 -w +es -o predict2.out predict2.f) >& log.tmp
predict2.out
```

GETSEQUENCE

```fortran
                            program getsequence
c ##########################################
c this programme inquires the input sequence
c version 1.0 1.2.93
c ##########################################
c
parameter (maxtest =50)
c
   integer inp,inr,outp
   dimension inr(maxtest),inp(maxtest),outp(maxtest)
   itell=0
c
c
write(6,*) "WELCOME TO NUMBSEQ, A PROGRAM THAT LEARNS"
write(6,*) "TO PREDICT SEQUENCES OF INTEGER NUMBERS!"
90 format(a85)
write(6,*) ' '
write(6,*) "Would you please be so kind as to invent a sequence of "
write(6,*) "integers and give me the first few instances?"
write(6,*) ' '
write(6,*) "I shall try to find an algorithm which reproduces"
write(6,*) "the instances you gave me."
        write(6,*) "I will then go on and actually predict subsequent members"
        write(6,*) "of the series you invented."
        write(6,*) "I hope to be successful in finding the correct successors!!"
        write(6,*) ' '
        write(6,*) "If I fail, please do not blame me!"
        write(6,*) "I would have certainly done the job correctly."
        write(6,*) ' '
        write(6,*) "Please complain to my creator, Wolfgang Banzhaf."
        write(6,*) "He will take care of it."
    write(6,*) ' '
write(6,*) ' '
        write(6,*) 'If you are ready to input the first number of your sequence,'
        write(6,*) 'I am now waiting for it.'
        do i=1,maxtest
           inr(i)=i
           read(5,*,err=100) inp(i)
           write(6,*) 'Thank you for the',i,'. number'
           write(6,*) ' '
           write(6,*) 'I am now waiting for the',i+1,'. number'
           write(6,*) "As soon as you want me to start my calculations"
           write(6,*) "please type anything except a number."
        end do
100 mt=i-1
write(6,*) ' '
   write(6,*) 'You were so kind to me to give me',mt,' numbers now.'
   write(6,*) 'I shall do my best to get the recipe! Please wait!'
        open(3,file='ex.dat',status='new')
do i=1,mt-1
   outp(i)=inp(i+1)
   write(3,*) inr(i),inp(i),outp(i)
   end do
   write(3,110) 'EOF'
110  format(a3)
        close(3)
        write(6,*) ' '
        write(6,*) ' '
        write(6,*) 'In the meantime, let me explain, what I am doing!'
        if (itell .eq. 0) then
            write(6,*) 'Oh, I was just told not to explain it, sorry!'
        else
```

```fortran
        write(6,*) 'I am first generating a population of random programs.'
        write(6,*) 'Then I am selecting and varying those programs which look'
        write(6,*) 'more promising for the task you gave me.'
        write(6,*) 'I shall discard the others and select again, and so on.'
        write(6,*) 'In this way 50 iterations may pass (I call them generations).'
        write(6,*) ' '
        write(6,*) 'Yes, indeed this is a Genetic Algorithm!'
        write(6,*) ' '
        write(6,*) 'If I did not find it I may then give up.'
        write(6,*) 'You will see the progress I make by observing a decreasing'
        write(6,*) 'number which is the average error of my programs.'
        endif
        stop
end
c==========================================================================
c
c

INOCULATE program inoculate
c ####################################
c this programme generates the first
c binary strings
c version 1.1 20.1.93
c ####################################
c
parameter (maxc =32)
parameter (maxd=5)
parameter (idims=225)
parameter (npop = 100)
parameter (idimcom=45)
parameter (istdep=22)
double precision drand48
character chr(maxc) * 5,sinter(idimcom) * 5
integer co,str,hilfs
dimension co(maxc,maxd),str(npop,idims),hilfs(maxd)
dimension icom(npop,idimcom)
cx iseed=434
        open(3,file='pss',status='old')
        read(3,12) iseed1,iseed2,iseed3
12 format(t57,i2,t60,i2,t63,i2)
        iseed=(iseed1+iseed2+iseed3)*iseed3
        if (iseed .eq. 0) iseed=iseed1+iseed2+iseed3
        write(6,*) 'My secret number of success is:',iseed
   do i=1,iseed
     x=drand48()
   end do
   close(3)
   open(3,file='code.dat',status='old')
do i=1,maxc
   read(3,*,err=100) (co(i,j),j=1,maxd),chr(i)
   end do 100 close(3)
do j=1,npop
   do i=1,idims
      x=drand48()
      if (x .le. .5) then
         str(j,i)=0
      else
         str(j,i)=1
      endif
   end do
end do
```

```fortran
      call repair(str,idims,maxd,idimcom,icom,npop)
      open(3,file='seq.dat',status='new')
      do i=1,npop
           write(3,1000) (str(i,j),j=1,idims)
      end do
1000  format(4(60I1/)//)
         close(3)
         open(7,file='seqtrans.dat',status='new')
      call compile(str,idims,maxd,maxc,chr,
     f   sinter,idimcom,co,hilfs,npop)
         do i=1,npop
             write(7,1010) (icom(i,j),j=1,idimcom)
         end do
1010  format(45I1)
      close(7)
         stop
      end
c================================================================
c
c
c
      subroutine compile(str,idims,maxd,maxc,chr,
     f   sinter,idimcom,co,hilfs,npop)
c ************************************
c interprets a  binary string and
c translates in chr-string
c ************************************
c
      character chr(maxc) * 5,sinter(idimcom) * 5
      integer str,co,hilfs
      dimension str(npop,idims),co(maxc,maxd),hilfs(maxd)
      do ipop=1,npop
        do i=1,idims/maxd
           do j=1,maxd
              hilfs(j)=str(ipop,(i-1)*maxd+j)
           end do
           do k=1,maxc
              do j=1,maxd
                 if (hilfs(j) .ne. co(k,j)) goto 100
              end do
              sinter(i)=chr(k)
                goto 200
100           continue
           end do
           write(6,*) 'kein code gefunden!',hilfs
200        continue
        end do
        write(7,2000) ipop,sinter
2000    format(i4,': ',45a5)
      end do
        return
      end
c
c
c
c
c
c #####################################################
      subroutine repair(str,idims,maxd,idimcom,icom,npop)
c ************************************
c examines on # of operations and
c eliminates unnecessary operations at
c the end of a string
c ************************************
```

```
c
integer str
dimension str(npop,idims),icom(npop,idimcom)
nopmax=(idimcom-1)/2
  do i=1,npop
    str(i,1)=0
  end do
do j=1,npop
  nop=0
    do i=1,idims/maxd
      icom(j,i)=0
      if (nop .lt. nopmax) then
        if (str(j,(i-1)*maxd+1) .eq. 0) then
          nop=nop+1
          icom(j,i)=1
        endif
      else
        if (str(j,(i-1)*maxd+1) .eq. 0)
   f     str(j,(i-1)*maxd+1)=1
        endif
      end do
  end do
  return
end

EVAL program eval
c #################################
c this programme evaluates algorithms
c version 1.3 21.1.93
c #################################
c
  implicit none
  integer npop,maxtest,thresh,igrenz
parameter (npop = 100)
parameter (maxtest =50)
parameter (thresh = 10)
parameter (igrenz=10000)
integer x1
integer z1,z2,z3,z4,z5,z6,z7,z8,z9,z10
integer z11,z12,z13,z14,z15,z16,z17,z18,z19,z20
integer z21,z22,z23,z24,z25,z26,z27,z28,z29,z30
integer z31,z32,z33,z34,z35,z36,z37,z38,z39,z40
integer z41,z42,z43,z44,z45,z46,z47,z48,z49,z50
integer z51,z52,z53,z54,z55,z56,z57,z58,z59,z60
integer z61,z62,z63,z64,z65,z66,z67,z68,z69,z70
integer z71,z72,z73,z74,z75,z76,z77,z78,z79,z80
integer z81,z82,z83,z84,z85,z86,z87,z88,z89,z90
integer z91,z92,z93,z94,z95,z96,z97,z98,z99,z100
integer plus,hoch,durch,modu,abso,ifeq
  integer i0,i1,i,mt,inr,inp,outp,ipop
  integer erg,qual,hit,zw
  real qualav,y
  double precision drand48
  dimension inr(maxtest),inp(maxtest),outp(maxtest)
  dimension qual(npop),hit(npop)

open(3,file='ex.dat',status='old')
do i=1,maxtest
   read(3,*,err=105) inr(i),inp(i),outp(i)
cc   write(6,*) inr(i),inp(i),outp(i)
end do
105 mt=i-1
```

```
cx mt=6
close(3)
c 1-10
ipop=ipop+1
  qual(ipop)=0
  hit(ipop)=1
do i=1,mt
   i0=inr(i)
   i1=inp(i)
      y=drand48()
      erg=z1(i0,i1)
   erg=max(-igrenz,min(igrenz,erg))
      zw=(erg-outp(i))**2
   if (zw .gt. thresh) hit(ipop)=0
   qual(ipop)=qual(ipop)+zw
   end do
write(6,*) ipop,hit(ipop),qual(ipop)
ipop=ipop+1
  qual(ipop)=0
  hit(ipop)=1
do i=1,mt
   i0=inr(i)
   i1=inp(i)
   erg=z2(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
  qual(ipop)=0
  hit(ipop)=1
do i=1,mt
   i0=inr(i)
   i1=inp(i)
   erg=z3(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
  qual(ipop)=0
  hit(ipop)=1
do i=1,mt
   i0=inr(i)
   i1=inp(i)
   erg=z4(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
  qual(ipop)=0
  hit(ipop)=1
do i=1,mt
   i0=inr(i)
```

```
      i1=inp(i)
      erg=z5(i0,i1)
      erg=max(-igrenz,min(igrenz,erg))
        zw=(erg-outp(i))**2
          if (zw .gt. thresh) hit(ipop)=0
      qual(ipop)=qual(ipop)+zw end do
write(6,*) ipop,hit(ipop),qual(ipop)
ipop=ipop+1
   qual(ipop)=0
   hit(ipop)=1
do i=1,mt
   i0=inr(i)
   i1=inp(i)
   erg=z6(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
   qual(ipop)=0
   hit(ipop)=1
do i=1,mt
   i0=inr(i)
   i1=inp(i)
   erg=z7(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
   qual(ipop)=0
   hit(ipop)=1
do i=1,mt
   i0=inr(i)
   i1=inp(i)
   erg=z8(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
   qual(ipop)=0
   hit(ipop)=1
do i=1,mt
   i0=inr(i)
   i1=inp(i)
   erg=z9(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
```

```
    ipop=ipop+1
      qual(ipop)=0
      hit(ipop)=1
    do i=1,mt
       i0=inr(i)
       i1=inp(i)
       erg=z10(i0,i1)
       erg=max(-igrenz,min(igrenz,erg))
       zw=(erg-outp(i))**2
       if (zw .gt. thresh) hit(ipop)=0
       qual(ipop)=qual(ipop)+zw end do
    write(6,*) ipop,hit(ipop),qual(ipop)
    c 11-20
    ipop=ipop+1
      qual(ipop)=0
      hit(ipop)=1
    do i=1,mt
       i0=inr(i)
       i1=inp(i)
       erg=z11(i0,i1)
       erg=max(-igrenz,min(igrenz,erg))
       zw=(erg-outp(i))**2
       if (zw .gt. thresh) hit(ipop)=0
       qual(ipop)=qual(ipop)+zw end do
    write(6,*) ipop,hit(ipop),qual(ipop)
    ipop=ipop+1
      qual(ipop)=0
      hit(ipop)=1
    do i=1,mt
       i0=inr(i)
       i1=inp(i)
       erg=z12(i0,i1)
       erg=max(-igrenz,min(igrenz,erg))
       zw=(erg-outp(i))**2
       if (zw .gt. thresh) hit(ipop)=0
       qual(ipop)=qual(ipop)+zw end do
    write(6,*) ipop,hit(ipop),qual(ipop)
    ipop=ipop+1
      qual(ipop)=0
      hit(ipop)=1
    do i=1,mt
       i0=inr(i)
       i1=inp(i)
       erg=z13(i0,i1)
       erg=max(-igrenz,min(igrenz,erg))
       zw=(erg-outp(i))**2
       if (zw .gt. thresh) hit(ipop)=0
       qual(ipop)=qual(ipop)+zw end do
    write(6,*) ipop,hit(ipop),qual(ipop)
    ipop=ipop+1
      qual(ipop)=0
      hit(ipop)=1
    do i=1,mt
       i0=inr(i)
       i1=inp(i)
       erg=z14(i0,i1)
       erg=max(-igrenz,min(igrenz,erg))
```

```
      zw=(erg-outp(i))**2
      if (zw .gt. thresh) hit(ipop)=0
      qual(ipop)=qual(ipop)+zw end do
write(6,*) ipop,hit(ipop),qual(ipop)
ipop=ipop+1
   qual(ipop)=0
   hit(ipop)=1
do i=1,mt
   i0=inr(i)
   i1=inp(i)
   erg=z15(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
   qual(ipop)=0
   hit(ipop)=1
do i=1,mt
   i0=inr(i)
   i1=inp(i)
   erg=z16(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
   qual(ipop)=0
   hit(ipop)=1
do i=1,mt
   i0=inr(i)
   i1=inp(i)
   erg=z17(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
   qual(ipop)=0
   hit(ipop)=1
do i=1,mt
   i0=inr(i)
   i1=inp(i)
   erg=z18(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
   qual(ipop)=0
   hit(ipop)=1
```

```
do i=1,mt
   i0=inr(i)
   i1=inp(i)
   erg=z19(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
  qual(ipop)=0
  hit(ipop)=1
do i=1,mt
   i0=inr(i)
   i1=inp(i)
   erg=z20(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
c 21-30
ipop=ipop+1
  qual(ipop)=0
  hit(ipop)=1
do i=1,mt
   i0=inr(i)
   i1=inp(i)
   erg=z21(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
  qual(ipop)=0
  hit(ipop)=1
do i=1,mt
   i0=inr(i)
   i1=inp(i)
     erg=z22(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
  qual(ipop)=0
  hit(ipop)=1
do i=1,mt
   i0=inr(i)
   i1=inp(i)
   erg=z23(i0,i1)
   erg=max(-igrenz,min(igrenz,erg))
   zw=(erg-outp(i))**2
   if (zw .gt. thresh) hit(ipop)=0
   qual(ipop)=qual(ipop)+zw
```

```
      end do
write(6,*) ipop,hit(ipop),qual(ipop)
ipop=ipop+1
   qual(ipop)=0
   hit(ipop)=1
do i=1,mt
   i0=inr(i)
   i1=inp(i)
   erg=z24(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
   qual(ipop)=0
   hit(ipop)=1
do i=1,mt
   i0=inr(i)
   i1=inp(i)
   erg=z25(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
   qual(ipop)=0
   hit(ipop)=1
do i=1,mt
   i0=inr(i)
   i1=inp(i)
   erg=z26(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
   qual(ipop)=0
   hit(ipop)=1
do i=1,mt
   i0=inr(i)
   i1=inp(i)
   erg=z27(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
   qual(ipop)=0
   hit(ipop)=1
do i=1,mt
   i0=inr(i)
   i1=inp(i)
   erg=z28(i0,i1)
```

```
      erg=max(-igrenz,min(igrenz,erg))
      zw=(erg-outp(i))**2
      if (zw .gt. thresh) hit(ipop)=0
      qual(ipop)=qual(ipop)+zw end do
write(6,*) ipop,hit(ipop),qual(ipop)
ipop=ipop+1
   qual(ipop)=0
   hit(ipop)=1
do i=1,mt
      i0=inr(i)
      i1=inp(i)
      erg=z29(i0,i1)
      erg=max(-igrenz,min(igrenz,erg))
      zw=(erg-outp(i))**2
      if (zw .gt. thresh) hit(ipop)=0
      qual(ipop)=qual(ipop)+zw end do
write(6,*) ipop,hit(ipop),qual(ipop)
ipop=ipop+1
   qual(ipop)=0
   hit(ipop)=1
do i=1,mt
      i0=inr(i)
      i1=inp(i)
      erg=z30(i0,i1)
      erg=max(-igrenz,min(igrenz,erg))
      zw=(erg-outp(i))**2
      if (zw .gt. thresh) hit(ipop)=0
      qual(ipop)=qual(ipop)+zw end do
write(6,*) ipop,hit(ipop),qual(ipop)
c 31-40
ipop=ipop+1
   qual(ipop)=0
   hit(ipop)=1
do i=1,mt
      i0=inr(i)
      i1=inp(i)
      erg=z31(i0,i1)
      erg=max(-igrenz,min(igrenz,erg))
      zw=(erg-outp(i))**2
      if (zw .gt. thresh) hit(ipop)=0
      qual(ipop)=qual(ipop)+zw end do
write(6,*) ipop,hit(ipop),qual(ipop)
ipop=ipop+1
   qual(ipop)=0
   hit(ipop)=1 do i=1,mt
      i0=inr(i)
      i1=inp(i)
      erg=z32(i0,i1)
      erg=max(-igrenz,min(igrenz,erg))
      zw=(erg-outp(i))**2
      if (zw .gt. thresh) hit(ipop)=0
      qual(ipop)=qual(ipop)+zw end do
write(6,*) ipop,hit(ipop),qual(ipop)
```

```
ipop=ipop+1
  qual(ipop)=0
  hit(ipop)=1
do i=1,mt
   i0=inr(i)
   i1=inp(i)
   erg=z33(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
  qual(ipop)=0
  hit(ipop)=1
do i=1,mt
   i0=inr(i)
   i1=inp(i)
   erg=z34(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
  qual(ipop)=0
  hit(ipop)=1
do i=1,mt
   i0=inr(i)
   i1=inp(i)
   erg=z35(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
  qual(ipop)=0
  hit(ipop)=1
do i=1,mt
   i0=inr(i)
   i1=inp(i)
   erg=z36(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
  qual(ipop)=0
  hit(ipop)=1
do i=1,mt
   i0=inr(i)
   i1=inp(i)
   erg=z37(i0,i1)
   erg=max(-igrenz,min(igrenz,erg))
   zw=(erg-outp(i))**2
```

```
      if (zw .gt. thresh) hit(ipop)=0
      qual(ipop)=qual(ipop)+zw end do
write(6,*) ipop,hit(ipop),qual(ipop)
ipop=ipop+1
   qual(ipop)=0
   hit(ipop)=1
do i=1,mt
   i0=inr(i)
   i1=inp(i)
   erg=z38(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
   qual(ipop)=0
   hit(ipop)=1
do i=1,mt
   i0=inr(i)
   i1=inp(i)
   erg=z39(i0,i1)
   erg=max(-igrenz,min(igrenz,erg))
   zw=(erg-outp(i))**2
   if (zw .gt. thresh) hit(ipop)=0
   qual(ipop)=qual(ipop)+zw
   end do
write(6,*) ipop,hit(ipop),qual(ipop)
ipop=ipop+1
   qual(ipop)=0
   hit(ipop)=1
do i=1,mt
   i0=inr(i)
   i1=inp(i)
   erg=z40(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
c 41-50
ipop=ipop+1
   qual(ipop)=0
   hit(ipop)=1
do i=1,mt
   i0=inr(i)
   i1=inp(i)
   erg=z41(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
   qual(ipop)=0
   hit(ipop)=1
```

```
do i=1,mt
   i0=inr(i)
   i1=inp(i)
   erg=z42(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
   qual(ipop)=0
   hit(ipop)=1
do i=1,mt
   i0=inr(i)
   i1=inp(i)
   erg=z43(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
   qual(ipop)=0
   hit(ipop)=1
do i=1,mt
   i0=inr(i)
   i1=inp(i)
   erg=z44(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
   qual(ipop)=0
   hit(ipop)=1
do i=1,mt
   i0=inr(i)
   i1=inp(i)
   erg=z45(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
   qual(ipop)=0
   hit(ipop)=1
do i=1,mt
   i0=inr(i)
   i1=inp(i)
   erg=z46(i0,i1)
   erg=max(-igrenz,min(igrenz,erg))
   zw=(erg-outp(i))**2
   if (zw .gt. thresh) hit(ipop)=0
   qual(ipop)=qual(ipop)+zw
```

```
      end do
write(6,*) ipop,hit(ipop),qual(ipop)
ipop=ipop+1
  qual(ipop)=0
  hit(ipop)=1
do i=1,mt
   i0=inr(i)
   i1=inp(i)
   erg=z47(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
  qual(ipop)=0
  hit(ipop)=1
do i=1,mt
   i0=inr(i)
   i1=inp(i)
   erg=z48(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
  qual(ipop)=0
  hit(ipop)=1
do i=1,mt
   i0=inr(i)
   i1=inp(i)
   erg=z49(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
  qual(ipop)=0
  hit(ipop)=1
do i=1,mt
   i0=inr(i)
   i1=inp(i)
   erg=z50(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
c 51-60
```

```
ipop=ipop+1
  qual(ipop)=0
  hit(ipop)=1
do i=1,mt
   i0=inr(i)
   i1=inp(i)
   erg=z51(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
  qual(ipop)=0
  hit(ipop)=1
do i=1,mt
   i0=inr(i)
   i1=inp(i)
   erg=z52(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
  qual(ipop)=0
  hit(ipop)=1
do i=1,mt
   i0=inr(i)
   i1=inp(i)
   erg=z53(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
  qual(ipop)=0
  hit(ipop)=1
do i=1,mt
   i0=inr(i)
   i1=inp(i)
   erg=z54(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
  qual(ipop)=0
  hit(ipop)=1
do i=1,mt
   i0=inr(i)
   i1=inp(i)
   erg=z55(i0,i1)
   erg=max(-igrenz,min(igrenz,erg))
   zw=(erg-outp(i))**2
   if (zw .gt. thresh) hit(ipop)=0
```

```
     qual(ipop)=qual(ipop)+zw end do
write(6,*) ipop,hit(ipop),qual(ipop)
ipop=ipop+1
   qual(ipop)=0
   hit(ipop)=1
do i=1,mt
   i0=inr(i)
   i1=inp(i)
   erg=z56(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
   qual(ipop)=0
   hit(ipop)=1
do i=1,mt
   i0=inr(i)
   i1=inp(i)
   erg=z57(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
   qual(ipop)=0
   hit(ipop)=1
do i=1,mt
   i0=inr(i)
   i1=inp(i)
   erg=z58(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
   qual(ipop)=0
   hit(ipop)=1
do i=1,mt
   i0=inr(i)
   i1=inp(i)
   erg=z59(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
   qual(ipop)=0
   hit(ipop)=1
do i=1,mt
```

```
      i0=inr(i)
      i1=inp(i)
      erg=z60(i0,i1)
      erg=max(-igrenz,min(igrenz,erg))
      zw=(erg-outp(i))**2
      if (zw .gt. thresh) hit(ipop)=0
      qual(ipop)=qual(ipop)+zw end do
write(6,*) ipop,hit(ipop),qual(ipop)
c 61-70
ipop=ipop+1
  qual(ipop)=0
  hit(ipop)=1
do i=1,mt
   i0=inr(i)
   i1=inp(i)
   erg=z61(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
  qual(ipop)=0
  hit(ipop)=1
do i=1,mt
   i0=inr(i)
   i1=inp(i)
   erg=z62(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
  qual(ipop)=0
  hit(ipop)=1
do i=1,mt
   i0=inr(i)
   i1=inp(i)
   erg=z63(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
  qual(ipop)=0
  hit(ipop)=1
do i=1,mt
   i0=inr(i)
   i1=inp(i)
   erg=z64(i0,i1)
   erg=max(-igrenz,min(igrenz,erg))
   zw=(erg-outp(i))**2
   if (zw .gt. thresh) hit(ipop)=0
   qual(ipop)=qual(ipop)+zw
```

```
   end do
write(6,*) ipop,hit(ipop),qual(ipop)
ipop=ipop+1
   qual(ipop)=0
   hit(ipop)=1
do i=1,mt
   i0=inr(i)
   i1=inp(i)
   erg=z65(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
   qual(ipop)=0
   hit(ipop)=1
do i=1,mt
   i0=inr(i)
   i1=inp(i)
   erg=z66(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
   qual(ipop)=0
   hit(ipop)=1
do i=1,mt
   i0=inr(i)
   i1=inp(i)
   erg=z67(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
   qual(ipop)=0
   hit(ipop)=1
do i=1,mt
   i0=inr(i)
   i1=inp(i)
   erg=z68(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
   qual(ipop)=0
   hit(ipop)=1
do i=1,mt
   i0=inr(i)
   i1=inp(i)
   erg=z69(i0,i1)
```

```
      erg=max(-igrenz,min(igrenz,erg))
      zw=(erg-outp(i))**2
      if (zw .gt. thresh) hit(ipop)=0
      qual(ipop)=qual(ipop)+zw
   end do
write(6,*) ipop,hit(ipop),qual(ipop)
ipop=ipop+1
   qual(ipop)=0
   hit(ipop)=1
do i=1,mt
   i0=inr(i)
   i1=inp(i)
   erg=z70(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
c 71-80
ipop=ipop+1
   qual(ipop)=0
   hit(ipop)=1
do i=1,mt
   i0=inr(i)
   i1=inp(i)
   erg=z71(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
   qual(ipop)=0
   hit(ipop)=1
do i=1,mt
   i0=inr(i)
   i1=inp(i)
   erg=z72(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
   qual(ipop)=0
   hit(ipop)=1
do i=1,mt
   i0=inr(i)
   i1=inp(i)
   erg=z73(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
   qual(ipop)=0
```

```
      hit(ipop)=1
do i=1,mt
   i0=inr(i)
   i1=inp(i)
   erg=z74(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
   qual(ipop)=0
   hit(ipop)=1
do i=1,mt
   i0=inr(i)
   i1=inp(i)
   erg=z75(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
   qual(ipop)=0
   hit(ipop)=1
do i=1,mt
   i0=inr(i)
   i1=inp(i)
   erg=z76(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
   qual(ipop)=0
   hit(ipop)=1
do i=1,mt
   i0=inr(i)
   i1=inp(i)
   erg=z77(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
   qual(ipop)=0
   hit(ipop)=1
do i=1,mt
   i0=inr(i)
   i1=inp(i)
   erg=z78(i0,i1)
   erg=max(-igrenz,min(igrenz,erg))
   zw=(erg-outp(i))**2
   if (zw .gt. thresh) hit(ipop)=0
   qual(ipop)=qual(ipop)+zw
```

```
      end do
write(6,*) ipop,hit(ipop),qual(ipop)
ipop=ipop+1
   qual(ipop)=0
   hit(ipop)=1
do i=1,mt
   i0=inr(i)
   i1=inp(i)
   erg=z79(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
   qual(ipop)=0
   hit(ipop)=1
do i=1,mt
   i0=inr(i)
   i1=inp(i)
   erg=z80(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
c 81-90
ipop=ipop+1
   qual(ipop)=0
   hit(ipop)=1
do i=1,mt
   i0=inr(i)
   i1=inp(i)
   erg=z81(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
   qual(ipop)=0
   hit(ipop)=1
do i=1,mt
   i0=inr(i)
   i1=inp(i)
   erg=z82(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
   qual(ipop)=0
   hit(ipop)=1
do i=1,mt
   i0=inr(i)
   i1=inp(i)
```

```
      erg=z83(i0,i1)
      erg=max(-igrenz,min(igrenz,erg))
      zw=(erg-outp(i))**2
      if (zw .gt. thresh) hit(ipop)=0
      qual(ipop)=qual(ipop)+zw end do
write(6,*) ipop,hit(ipop),qual(ipop)
ipop=ipop+1
   qual(ipop)=0
   hit(ipop)=1
do i=1,mt
   i0=inr(i)
   i1=inp(i)
   erg=z84(i0,i1)
   erg=max(-igrenz,min(igrenz,erg))
   zw=(erg-outp(i))**2
   if (zw .gt. thresh) hit(ipop)=0
   qual(ipop)=qual(ipop)+zw
   end do
write(6,*) ipop,hit(ipop),qual(ipop)
ipop=ipop+1
   qual(ipop)=0
   hit(ipop)=1
do i=1,mt
   i0=inr(i)
   i1=inp(i)
   erg=z85(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
   qual(ipop)=0
   hit(ipop)=1
do i=1,mt
   i0=inr(i)
   i1=inp(i)
   erg=z86(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
   qual(ipop)=0
   hit(ipop)=1
do i=1,mt
   i0=inr(i)
   i1=inp(i)
   erg=z87(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
```

```
      qual(ipop)=0
      hit(ipop)=1
   do i=1,mt
      i0=inr(i)
      i1=inp(i)
      erg=z88(i0,i1)
      erg=max(-igrenz,min(igrenz,erg))
      zw=(erg-outp(i))**2
      if (zw .gt. thresh) hit(ipop)=0
      qual(ipop)=qual(ipop)+zw end do
write(6,*) ipop,hit(ipop),qual(ipop)
ipop=ipop+1
      qual(ipop)=0
      hit(ipop)=1
   do i=1,mt
      i0=inr(i)
      i1=inp(i)
      erg=z89(i0,i1)
      erg=max(-igrenz,min(igrenz,erg))
      zw=(erg-outp(i))**2
      if (zw .gt. thresh) hit(ipop)=0
      qual(ipop)=qual(ipop)+zw end do
write(6,*) ipop,hit(ipop),qual(ipop)
ipop=ipop+1
      qual(ipop)=0
      hit(ipop)=1
do i=1,mt
      i0=inr(i)
      i1=inp(i)
      erg=z90(i0,i1)
      erg=max(-igrenz,min(igrenz,erg))
      zw=(erg-outp(i))**2
      if (zw .gt. thresh) hit(ipop)=0
      qual(ipop)=qual(ipop)+zw end do
write(6,*) ipop,hit(ipop),qual(ipop)
c 91-100
ipop=ipop+1
   qual(ipop)=0
   hit(ipop)=1
do i=1,mt
      i0=inr(i)
      i1=inp(i)
      erg=z91(i0,i1)
      erg=max(-igrenz,min(igrenz,erg))
      zw=(erg-outp(i))**2
      if (zw .gt. thresh) hit(ipop)=0
      qual(ipop)=qual(ipop)+zw end do
write(6,*) ipop,hit(ipop),qual(ipop)
ipop=ipop+1
   qual(ipop)=0
   hit(ipop)=1
do i=1,mt
      i0=inr(i)
      i1=inp(i)
      erg=z92(i0,i1)
      erg=max(-igrenz,min(igrenz,erg))
      zw=(erg-outp(i))**2
```

```
          if (zw .gt. thresh) hit(ipop)=0
          qual(ipop)=qual(ipop)+zw end do
write(6,*) ipop,hit(ipop),qual(ipop)
ipop=ipop+1
   qual(ipop)=0
   hit(ipop)=1
do i=1,mt
   i0=inr(i)
   i1=inp(i)
   erg=z93(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
   qual(ipop)=0
   hit(ipop)=1
do i=1,mt
   i0=inr(i)
   i1=inp(i)
   erg=z94(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
   qual(ipop)=0
   hit(ipop)=1
do i=1,mt
   i0=inr(i)
   i1=inp(i)
   erg=z95(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
   qual(ipop)=0
   hit(ipop)=1
do i=1,mt
   i0=inr(i)
   i1=inp(i)
   erg=z96(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
   qual(ipop)=0
   hit(ipop)=1
do i=1,mt
```

```
      i0=inr(i)
      i1=inp(i)
      erg=z97(i0,i1)
      erg=max(-igrenz,min(igrenz,erg))
      zw=(erg-outp(i))**2
      if (zw .gt. thresh) hit(ipop)=0
      qual(ipop)=qual(ipop)+zw end do
write(6,*) ipop,hit(ipop),qual(ipop)
ipop=ipop+1
   qual(ipop)=0
   hit(ipop)=1
do i=1,mt
   i0=inr(i)
   i1=inp(i)
   erg=z98(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)
ipop=ipop+1
   qual(ipop)=0
   hit(ipop)=1
do i=1,mt
   i0=inr(i)
   i1=inp(i)
   erg=z99(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do write(6,*) ipop,hit(ipop),qual(ipop)
ipop=ipop+1
   qual(ipop)=0
   hit(ipop)=1
do i=1,mt
   i0=inr(i)
   i1=inp(i)
   erg=z100(i0,i1)
   erg=max(-igrenz,min(igrenz,erg))
   zw=(erg-outp(i))**2
   if (zw .gt. thresh) hit(ipop)=0
   qual(ipop)=qual(ipop)+zw end do
write(6,*) ipop,hit(ipop),qual(ipop)

cx qualav=0.
cx do ipop=1,npop
cx    qualav=qualav+real(qual(ipop))
cx end do
cx write(6,*) qualav/real(npop)
```

```
      stop
end include "func.tmp"
include "extern.f"

function plus(ia,ib)
integer plus
  plus=ia+ib
    return
end
c
function minus(ia,ib)
minus=ia-ib
return
end
c
function mal(ia,ib)
mal=ia*ib
return
end
c
function hoch(ia,ib)
integer hoch c write(6,*) 'hoch',ia,ib
if (ia .eq. 0) then
   hoch=1
else
c     if ((ia .ge. 1000) .or. (ib .ge. 1000)) then
c         hoch=1000
c     else
      hoch=ia**ib
c     endif
endif
c hoch=min(hoch,100)
  return
end
c
function durch(ia,ib)
integer durch
if (ib .ne. 0) then
   durch=nint(real(ia)/real(ib))
  else
   durch=1000
endif
return
end
c
function modu(ia,ib)
integer modu
if (ib .ne. 0) then
   modu=mod(ia,ib)
  else
   modu=ia
endif
return
end
c
function abso(ia,ib)
integer abso
abso=abs(ia)
  return
```

```
      end
c
function ifeq(ia,ib)
integer ifeq
ifeq=0
if (ia .eq. ib) then
    ifeq=1
endif
return
end
```

VARY

```
program vary c ############################
c this program mutates strings
c t=2 tournament selection
c version 1.1 20.1.93
c ############################
c
parameter (maxc =32)
parameter (maxd=5)
parameter (idims=225)
parameter (npop = 100)
parameter (idimcom=45)
parameter (istdep=22)
parameter (itourn=2)
double precision drand48
character chr(maxc) * 5,sinter(idimcom) * 5
   integer co,str,hilfs
dimension co(maxc,maxd),str(npop,idims),hilfs(maxd)
dimension icom(npop,idimcom),iqual(npop),ihit(npop)
dimension hilfs1(idims),hilfs2(idims)
   open(3,file='code.dat',status='old')
   prob1=.0
   prob2=.7
   prob3=.8
   prob4=.0
   prob5=.9
   prob6=.0
   prob7=1.0
do i=1,maxc
   read(3,*,err=100) (co(i,j),j=1,maxd),chr(i)
   end do
100 close(3)
      open(3,file='seq.dat',status='old')
do i=1,npop
      read(3,1000) (str(i,j),j=1,idims)
end do
1000 format(4(60I1/)//)
      close(3)
      open(3,file='quality.dat',status='old')
      ihitsum=0
      qualav=0.
      do i=1,npop
         read(3,*) k,ihit(i),iqual(i)
         ihitsum=ihitsum+ihit(i)
         qualav=qualav+real(iqual(i))
      end do
cx     read(3,*) qualav
close(3)
qualav=qualav/real(npop)
```

```
            write(6,*) 'Average:',qualav,'   # of hits:',ihitsum
            open(3,file='pss',status='old')
            read(3,12) iseed1,iseed2,iseed3
 12   format(t57,i2,t60,i2,t63,i2)
            iseed=(iseed1+iseed2+iseed3)*iseed3
            if (iseed .eq. 0) iseed=iseed1+iseed2+iseed3
c           write(6,*) iseed
       do i=1,iseed
         x=drand48()
       end do
c
cx    write(6,*) 'code rand',
cx        f  ((co(1,m),m=1,maxd),1=1,maxc)
            do j=1,npop
               x=drand48()
c flip (1x)
       if (x .lt. prob1) then
            ind=int(drand48()*npop)+1
            igen=int(drand48()*idims)+1
            str(ind,igen)=abs(str(ind,igen)-1)
            goto 4000
       endif
c flip (guassian mehrmals)
       if (x .lt. prob2) then
            ind=int(drand48()*npop)+1
            s=0.
 103        y=drand48()
         igen=int(drand48()*idims)+1
            str(ind,igen)=abs(str(ind,igen)-1)
            s=s+y
            if (s .lt. 6)  goto 103
            goto 4000
       endif
       if (x .lt. prob3) then
c shift rechts
c nur die signifikanten bits
         ind=int(drand48()*npop)+1
         iwo=int(drand48()*(idimcom-1))+1
                do ii=iwo*maxd+1,maxd+1,-maxd
                    str(ind,ii)=str(ind,ii-maxd)
                end do
                str(ind,1)=1
                goto 4000
            endif
       if (x .lt. prob4) then
c shift rechts
         ind=int(drand48()*npop)+1
         iwo=int(drand48()*(idims-1))+1
                do ii=iwo,2,-1
                    str(ind,ii)=str(ind,ii-1)
                end do
                str(ind,1)=1
                goto 4000
            endif
            if (x .lt. prob5) then
c shift links
cx              ind=int(drand48()*npop)+1
cx              igen=int(drand48()*idims)+1
c nur die signifikanten bits
         ind=int(drand48()*npop)+1
         iwo=int(drand48()*(idimcom-2))+1
                ih=str(ind,iwo*maxd+1)
                do i=iwo,idimcom-2
                    str(ind,i*maxd+1)=str(ind,(i+1)*maxd+1)
                end do
```

```
                    str(ind,(idimcom-1)*maxd+1)=ih
                    goto 4000
        endif
            if (x .lt. prob6) then
c shift links
cx          ind=int(drand48()*npop)+1
cx          igen=int(drand48()*idims)+1
            ind=int(drand48()*npop)+1
        iwo=int(drand48()*(idims-1))+1
                ih=str(ind,iwo)
                do i=iwo,idims-1
                    str(ind,i)=str(ind,i+1)
                end do
                str(ind,idims)=ih
                goto 4000
        endif
            if (x .lt. prob7) then
c rekombination
                ind1=int(drand48()*npop)+1
102             ind2=int(drand48()*npop)+1
                if (ind1 .eq. ind2) goto 102
                igen=int(drand48()*idimcom)+1
                do i=1,idims
                    if (i .le. igen*maxd) then
                        hilfs1(i)=str(ind1,i)
                        hilfs2(i)=str(ind2,i)
                    else
                        hilfs1(i)=str(ind2,i)
                        hilfs2(i)=str(ind1,i)
                    endif
                end do
                do i=1,idims
                    str(ind1,i)=hilfs1(i)
                    str(ind2,i)=hilfs2(i)
                end do
            endif
4000    continue
c   write(6,*) j,ind,ind1,ind2,' varied'
end do
c jetzt erst abspeichern, dann reparieren
cx  call repair(str,idims,maxd,idimcom,icom,npop)
    open(3,file='seq.tmp',status='new')
do i=1,npop
        write(3,1000) (str(i,j),j=1,idims)
end do
        close(3)
    call repair(str,idims,maxd,idimcom,icom,npop)
        open(7,file='seqtrans.tmp',status='new')
        call compile(str,idims,maxd,maxc,chr,
    f   sinter,idimcom,co,hilfs,npop)
        do i=1,npop
            write(7,1010) (icom(i,j),j=1,idimcom)
        end do
1010 format(45I1)
    close(7)
        stop
end
c=================================================================
c
c
c
subroutine compile(str,idims,maxd,maxc,chr,
    f   sinter,idimcom,co,hilfs,npop)
```

```
c ************************************
c interprets binary string and
c translates in chr-string
c ************************************
c
      character chr(maxc) * 5,sinter(idimcom) * 5
      integer str,co,hilfs
      dimension str(npop,idims),co(maxc,maxd),hilfs(maxd)
         do ipop=1,npop
      do i=1,idims/maxd
         do j=1,maxd
            hilfs(j)=str(ipop,(i-1)*maxd+j)
         end do
         do k=1,maxc
            do j=1,maxd
               if (hilfs(j) .ne. co(k,j)) goto 100
            end do
            sinter(i)=chr(k)
              goto 200
100         continue
         end do
         write(6,*) 'kein code gefunden!',hilfs,
     f    ((co(l,m),m=1,maxd),l=1,maxc)
200      continue
      end do
      write(7,2000) ipop,sinter
2000     format(i4,': ',45a5)
      end do
        return
      end
c
c
c
c
c
c #########################################
      subroutine repair(str,idims,maxd,idimcom,icom,npop)
c ***************************************
c examines on # operations, eliminates
c unnecessary ones at the end of strings .
c ***************************************
c
      integer str
      dimension str(npop,idims),icom(npop,idimcom)
      nopmax=(idimcom-1)/2
        do i=1,npop
          str(i,1)=0
      end do
      do j=1,npop
         nop=0
         do i=1,idims/maxd
            icom(j,i)=0
            if (nop .lt. nopmax) then
               if (str(j,(i-1)*maxd+1) .eq. 0) then
                  nop=nop+1
                  icom(j,i)=1
               endif
            else
               if (str(j,(i-1)*maxd+1) .eq. 0)
     f            str(j,(i-1)*maxd+1)=1
            endif
         end do
      end do
```

```
      return
    end
c
c
c

EDITLOOP program editloop
c ####################################
c this program edits the programs
c version 1.2 20.1.93
c ####################################
c
parameter (maxc =32)
parameter (maxd=5)
parameter (idims=225)
parameter (npop = 100)
parameter (idimcom=45)
parameter (istdep=22)
   character sinter(npop,idimcom) * 5, command *220,hilfs(idimcom) *5
   character chc*2,zahl*5
integer stack
   dimension icom(npop,idimcom),stack(0:istdep)
        open(7,file='seqtrans.tmp',status='old')
do i=1,npop
   read(7,2000) ipop,chc,hilfs
   do j=1,idimcom
      sinter(i,j)=hilfs(j)
   end do
2000    format(i4,a2,45a5)
  end do
        do i=1,npop
           read(7,2010) (icom(i,j),j=1,idimcom)
        end do
2010 format(45I1)
  close(7)
       open(3,file='func.tmp',status='new')
       do ipop=1,npop
        iz=0
       is=0
       command=''
       do i=1,istdep
          stack(i)=0
       end do
        do i=1,idimcom
            if (iz .gt. 220) write(6,*) 'ueberlauf'
            if (icom(ipop,i) .eq. 1) then
              stack(is)=stack(is)-1
              stack(is+1)=2
              is=is+1
              do j=1,5
                 if (ichar(sinter(ipop,i)(j:j)) .ne. 32) then
                    iz=iz+1
                    command(iz:iz)=sinter(ipop,i)(j:j)
                 else
                    iz=iz+1
                    command(iz:iz)='('
                    goto 200
                 endif
              end do
              iz=iz+1
              command(iz:iz)='('
           else
```

```
                stack(is)=stack(is)-1
                do j=1,5
                   if (ichar(sinter(ipop,i)(j:j)) .ne. 32) then
                      iz=iz+1
                      command(iz:iz)=sinter(ipop,i)(j:j)
                   else
                      iz=iz+1
                      if (stack(is) .eq. 1) then
c erstes argument: ond,
                         command(iz:iz)=','
cx       write(6,*) '1',is,stack(is),command(iz:iz)
                         goto 200
                      else
c zweites argument ond)
                         command(iz:iz)=')'
cx write(6,*) '2',is,stack(is),command(iz:iz)
                         is=is-1
                         goto 210
                      endif
                   endif
                end do
210         if (stack(is) .eq. 0) then
            iz=iz+1
            command(iz:iz)=')'
cx          write(6,*) 'n',is,stack(is),command(iz:iz)
                if (is .eq. 1) goto 220
            is=is-1
            goto 210
         else
            if (is .eq. 0) goto 220
            iz=iz+1
            command(iz:iz)=','
cx          write(6,*) 'n',is,stack(is),command(iz:iz)
         endif
            endif
200         continue
         end do
220  continue
c220       write(6,2050) command
 2050 format(a220)
         call change_to_char(ipop,zahl,kmin)
         write(3,2059) zahl
 2059 format(' function z',a<kmin>,'(i0,i1)')
         write(3,2058) zahl
 2058 format(' integer z',a<kmin>,',durch,hoch,plus,modu,abso,ifeq')
         write(3,2060) zahl,command
 2060 format(' z',a<kmin>,'=',a220)
         write(3,*) ' return'
         write(3,*) ' end'
         write(3,*) '.'
         write(3,*) ' '
         end do
         close(3)
         stop
end
c================================================================
c
c
include "change_to_char.f"
```

SELECT

```fortran
      program select
c #################################
c this  program selects strings
c t=2 tournament selection
c version 1.1 20.1.93
c #################################
c
      parameter (maxc =32)
      parameter (maxd=5)
      parameter (idims=225)
      parameter (npop = 100)
      parameter (idimcom=45)
      parameter (istdep=22)
      parameter (ibestalt=0)
      parameter (ibestneu=50)
        character sinter(npop,idimcom) * 5, hilfs(idimcom) *5
      character sintervar(npop,idimcom) * 5
        character chc*2
        integer str
      dimension str(npop,idims),strvar(npop,idims)
      dimension icom(npop,idimcom),iqual(npop),ihit(npop)
      dimension icomvar(npop,idimcom),iqualvar(npop),ihitvar(npop)
      dimension kind(npop),kindvar(npop),icomneu(npop,idimcom)
c
c lies vorige generation ein
      open(3,file='seq.dat',status='old')
      do i=1,npop
           read(3,1000) (str(i,j),j=1,idims)
cx         write(6;1000) (str(i,j),j=1,idims)
      end do
1000  format(4(60I1/)//)
             close(3)
             open(3,file='qd.tmp',status='old')
        marke=0
             do i=1,npop
                 read(3,*) kind(i),ihit(i),iqual(i)
                 if ((marke .eq. 0) .and. (iqual(i) .eq. 0)) then
cx               quav=quav+real(iqual(i))
cx               write(6,*) kind(i),ihit(i),iqual(i)
           write(6,*) 'Heureka!!!',i,iqual(i)
           marke=1
        endif
             end do
      close(3)
             open(7,file='seqtrans.dat',status='old')
      do i=1,npop
         read(7,2000) ipop,chc,hilfs
cx       write(6,2000) ipop,chc,hilfs
         do j=1,idimcom
            sinter(i,j)=hilfs(j)
         end do
2000     format(i4,a2,45a5)
         end do
             do i=1,npop
                 read(7,2010) (icom(i,j),j=1,idimcom)
cx               write(6,2010) (icom(i,j),j=1,idimcom)
```

```
          end do
2010 format(45I1)
   close(7)
c lies die variationen ein
open(3,file='seq.tmp',status='old')
do i=1,npop
     read(3,1000) (strvar(i,j),j=1,idims)
cx      write(6,1000) (strvar(i,j),j=1,idims)
end do
        close(3)
        open(3,file='qt.tmp',status='old')
        marke=0
        do i=1,npop
           read(3,*) kindvar(i),ihitvar(i),iqualvar(i)
           if ((marke .eq. 0) .and. (iqualvar(i) .eq. 0)) then
              write(6,*) 'Heureka!!!',i,iqualvar(i)
              marke=1
           endif
        end do
   close(3)
        open(7,file='seqtrans.tmp',status='old')
 do i=1,npop
    read(7,2000) ipop,chc,hilfs
cx     write(6,2000) ipop,chc,hilfs
    do j=1,idimcom
       sintervar(i,j)=hilfs(j)
    end do
    end do
        do i=1,npop
           read(7,2010) (icomvar(i,j),j=1,idimcom)
cx           write(6,2010) (icomvar(i,j),j=1,idimcom)
        end do
    close(7)
c sammle zusammen
open(3,file='seq.new',status='new')
        open(7,file='quality.new',status='new')
        open(8,file='seqtrans.new',status='new')
it=1
id=1
do i=1,npop
    if (((iqualvar(it) .le. iqual(id)) .and.
   f   (i .gt. ibestalt)) .or. (i .le. ibestneu)) then
       write(7,*) i,ihitvar(it),iqualvar(it)
         write(3,1000) (strvar(kindvar(it),j),j=1,idims)
         do j=1,idimcom
           hilfs(j)=sintervar(kindvar(it),j)
           icomneu(i,j)=icomvar(kindvar(it),j)
         end do
         write(8,2000) i,chc,hilfs
cx         write(6,*) 'von tmp',it,kindvar(it)
cx         write(6,2000) i,chc,hilfs
         it=it+1
    else
         write(7,*) i,ihit(id),iqual(id)
           write(3,1000) (str(kind(id),j),j=1,idims)
           do j=1,idimcom
             hilfs(j)=sinter(kind(id),j)
             icomneu(i,j)=icom(kind(id),j)
           end do
           write(8,2000) i,chc,hilfs
           id=id+1
    endif
 end do
         do i=1,npop
            write(8,2010) (icomneu(i,j),j=1,idimcom)
```

```
          end do
          close(3)
          close(7)
          close(8)
          stop
end
c================================================================
c
c
```

PREDICT

```
program predict
c ####################################
c this program predicts numbers
c version 1.0 2.2.93
c ####################################
c
   implicit none
   integer npop,maxtest,thresh,igrenz
   parameter (npop = 100)
   parameter (maxtest =50)
   parameter (thresh = 10)
   parameter (igrenz=10000)
   integer z1
   integer plus,hoch,durch,modu,abso,ifeq,ipred
     integer i0,i1,i,mt,inr,inp,outp,ipop
     integer erg,qual,hit,zw
     real qualav
     dimension inr(maxtest),inp(maxtest),outp(maxtest)
     dimension qual(npop),hit(npop)

open(3,file='ex.dat',status='old')
do i=1,maxtest
   read(3,*,err=105) inr(i),inp(i),outp(i)
cc   write(6,*) inr(i),inp(i),outp(i)
end do
105 mt=i-1
close(3)
c 1-10
ipop=ipop+1
  qual(ipop)=0
  hit(ipop)=1
cx write(6,*) 'I0,I1,0,erg'
write(6,*) 'I reproduce first the given sequence'
write(6,*) inp(1)
do i=1,mt
   i0=inr(i)
   i1=inp(i)
   erg=z1(i0,i1)
   erg=max(-igrenz,min(igrenz,erg))
   write(6,*) erg
     zw=(erg-outp(i))**2
   if (zw .gt. thresh) hit(ipop)=0
   qual(ipop)=qual(ipop)+zw
  end do
write(6,*) 'How many numbers do you want me to predict?'
read(5,*) ipred
120  do i=1,ipred
   i0=mt+i
   i1=erg
   erg=z1(i0,i1)
```

```fortran
      erg=max(-igrenz,min(igrenz,erg))
      write(6,*) 'next is:',erg
      end do
      write(6,*) 'You want more?'
      write(6,*) 'How many? Type 0 for exit'
      mt=i0
      read(5,*) ipred
      if (ipred .eq. 0) stop
      write(6,*) 'I repeat my former predictions and then go on.'
      goto 120
      stop
      end include "func.dat"

function plus(ia,ib)
      integer plus
      plus=ia+ib
      return
      end
c
      function minus(ia,ib)
      minus=ia-ib
      return
      end
c
      function mal(ia,ib)
      mal=ia*ib
      return
      end
c
      function hoch(ia,ib)
      integer hoch
c     write(6,*) 'hoch',ia,ib
      if (ia .eq. 0) then
        hoch=1
      else
c       if ((ia .ge. 1000) .or. (ib .ge. 1000)) then
c         hoch=1000
c       else
          hoch=ia**ib
c       endif
      endif
c     hoch=min(hoch,100)
      return
      end
c
      function durch(ia,ib)
      integer durch
      if (ib .ne. 0) then
        durch=nint(real(ia)/real(ib))
      else
        durch=1000
      endif
      return
      end
c
      function modu(ia,ib)
      integer modu
      if (ib .ne. 0) then
        modu=mod(ia,ib)
      else
        modu=ia
      endif
      return
      end
c
      function abso(ia,ib)
      integer abso
      abso=abs(ia)
      return
      end
c
```

```
function ifeq(ia,ib)
integer ifeq
ifeq=0
if (ia .eq. ib) then
   ifeq=1
endif
return
end
```

PREPARE

```
program prepare
c ####################################
c this program prepares new corrected
c files ex.dat and funcalt.dat
c version 1.0 1.2.93
c ####################################
c
parameter (maxtest =50)
c
   integer inp,inr,outp,erg
   character chr*5, chara*220
   dimension inr(maxtest),inp(maxtest),outp(maxtest)
   itell=0
c
c15
open(3,file='exalt.dat',status='old')
        do i=1,maxtest
           read(3,*,err=100) inr(i),inp(i),outp(i)
c          write(6,*) inr(i),inp(i),outp(i)
        end do
100 mt=i-1
close(3)

open(3,file='ex.dat',status='new')
        open(7,file='pred.dat',status='old')
        read(7,*) chr
        read(7,*) erg
do i=1,mt
   read(7,*) erg
c    write(6,*) erg
c    write(6,*) inr(i),inp(i),outp(i)-erg
   write(3,*) inr(i),inp(i),outp(i)-erg
   end do
   write(3,110) 'EOF'
110 format(a3)
        close(3)
        close(7)
        open(3,file='func.dat',status='old')
        open(7,file='funcalt.dat',status='new')
        do i=1,6
           read(3,120) chara
           do j=1,220
              if (chara(j:j) .eq. 'z') chara(j:j)='x'
           end do
           write(7,120) chara
        end do
120 format(a220)
```

```
       close(7)
       close(3)
       stop
end
c================================================================
c
c

PREDICT2 program predict2
c #######################################
c this programpredicts numbers, 2. round
c version 1.2 3.2.93
c #######################################
c
   implicit none
   integer npop,maxtest,thresh,igrenz
parameter (npop = 100)
parameter (maxtest =50)
parameter (thresh = 10)
parameter (igrenz=10000)
integer z1,x1
integer plus,hoch,durch,modu,abso,ifeq,ipred
   integer i0,i1,i,mt,inr,inp,outp,ipop
   integer erg,qual,hit,zw
   real qualav
   dimension inr(maxtest),inp(maxtest),outp(maxtest)
   dimension qual(npop),hit(npop)

open(3,file='ex.dat',status='old')
do i=1,maxtest
   read(3,*,err=105) inr(i),inp(i),outp(i)
cc    write(6,*) inr(i),inp(i),outp(i)
end do
105 mt=i-1 close(3)
c 1-10
ipop=ipop+1
   qual(ipop)=0
   hit(ipop)=1
cx write(6,*) 'I0,I1,0,erg'
write(6,*) 'I reproduce first the given sequence'
write(6,*) inp(1)
do i=1,mt
   i0=inr(i)
   i1=inp(i)
   erg=z1(i0,i1)+x1(i0,i1)
   erg=max(-igrenz,min(igrenz,erg))
   write(6,*) erg
    zw=(erg-outp(i))**2
   if (zw .gt. thresh) hit(ipop)=0
   qual(ipop)=qual(ipop)+zw
   end do
write(6,*) 'How many numbers do you want me to predict?'
read(5,*) ipred
120  do i=1,ipred
   i0=mt+i
   i1=erg
   erg=z1(i0,i1)+x1(i0,i1)
   erg=max(-igrenz,min(igrenz,erg))
   write(6,*) 'next is:',erg
```

```fortran
      end do
      write(6,*) 'You want more?'
      write(6,*) 'How many? Type 0 for exit'
        mt=i0
      read(5,*) ipred
      if (ipred .eq. 0) stop
      write(6,*) 'I repeat my former predictions and then go on.'
      goto 120
      stop
      end include "func.dat"
      include "funcalt.dat"

function plus(ia,ib)
integer plus
  plus=ia+ib
    return
end
c
function minus(ia,ib)
minus=ia-ib
return
end
c
function mal(ia,ib)
mal=ia*ib
return
end
c
function hoch(ia,ib)
integer hoch
c write(6,*) 'hoch',ia,ib
if (ia .eq. 0) then
   hoch=1
else
c    if ((ia .ge. 1000) .or. (ib .ge. 1000)) then
c        hoch=1000
c    else
      hoch=ia**ib
c    endif
endif
c hoch=min(hoch,100)
  return
end
c
function durch(ia,ib)
integer durch
if (ib .ne. 0) then
   durch=nint(real(ia)/real(ib))
  else
   durch=1000
endif
return
end
c
function modu(ia,ib)
integer modu
if (ib .ne. 0) then
   modu=mod(ia,ib)
  else
   modu=ia
endif
```

```
return
end
c
function abso(ia,ib)
integer abso
abso=abs(ia)
   return
end
c
function ifeq(ia,ib)
integer ifeq
ifeq=0
if (ia .eq. ib) then
    ifeq=1
endif
return
end
```

Having above indicated a preferred embodiment of the present invention, it will occur to those skilled in the art that modifications and alternatives can be practiced within the spirit of the invention. It is accordingly intended to define the scope of the invention only as indicated in the following claims.

I claim:

1. A method for determining a rule which governs the generation of a string of integers, comprising the steps of:

generating an input string of integers;

initially generating a set of trial programs for use in generating a set of trial integer sequences, each of said programs corresponding to a predetermined integer generating rule;

running said set of trial programs to generate a corresponding set of trial integer sequences;

comparing said input string of integers with each of said trial integer sequences and for generating an error measure corresponding to the difference therebetween; and, selecting which program in said set of trial programs executes, the execution of which results in the generation of an integer sequence most closely approximating said input integer string, thereby to identify the rule which governs the generation of said input string of integers.

2. The method of claim 1, wherein said step of generating said set of trial programs includes the step of iteratively selecting additional programs for generation of additional trial integer sequences such that additional integer sequences are compared with said input integer string until said error measure is below a predetermined threshold.

3. The method of claim 2, wherein said step of generating said set of trial programs includes the step of automatically initially generating a number of random programs for use as said set of trial programs.

4. The method of claim 3, wherein the number of additional programs exceeds the number of trial programs initially generated and wherein said selecting step includes the step coupled to said program generating means and responsive to said error measure for generating said additional number of trial programs.

5. The method of claim 4, wherein said selecting step includes the step of selecting either a larger or smaller number of additional trial programs responsive to said error measure such that for each subsequent iteration the error measure is either reduced or unchanged, thereby to permit more rapid reduction of said error measure and thus more rapid convergence to the most closely approximating trial integer sequence and corresponding trial program.

* * * * *